United States Patent [19]
Bell, Sr.

[11] Patent Number: 4,684,114
[45] Date of Patent: Aug. 4, 1987

[54] INDEX TABLES

[76] Inventor: Theodore F. Bell, Sr., 26 Twin Rivers Dr., Ormond Beach, Fla. 32074

[21] Appl. No.: 925,159

[22] Filed: Oct. 31, 1986

[51] Int. Cl.$^4$ ............................................. B23Q 1/16
[52] U.S. Cl. ....................................... 269/57; 269/70; 74/820
[58] Field of Search ....................... 269/57, 61, 63, 66, 269/69, 70; 74/813 C, 816, 817, 820

[56] References Cited
U.S. PATENT DOCUMENTS

| | | | |
|---|---|---|---|
| 2,389,744 | 11/1945 | Robbins | 269/57 |
| 2,535,490 | 12/1950 | Emrick | 74/820 X |
| 3,243,676 | 3/1966 | Willmann | 74/820 X |
| 3,606,804 | 9/1971 | Gotz et al. | 74/820 |
| 4,049,252 | 9/1977 | Bell | 269/57 |

Primary Examiner—Frederick R. Schmidt
Assistant Examiner—Steven P. Schad
Attorney, Agent, or Firm—Barnes, Kisselle, Raisch, Choate, Whittemore & Hulbert

[57] ABSTRACT

An index table comprising a base, a main plate mounted on the base, a drive wheel mounted for rotation on one side of the main plate about a first axis transverse to the main plate, a work plate on the other side of the main plate rotatably mounted about a second transverse axis spaced from the first transverse axis, and a segment wheel mounted on the one side of said main plate and fixed with relation to the work plate. Circumferentially spaced segment drivers are mounted on the drive wheel and are adapted to engage circumferentially spaced slots on the segment wheel to intermittently drive the segment wheel and in turn the work plate. A yoke plate is mounted on the one side of the main plate for movement radially with respect to the drive wheel and the segment wheel. As the drive wheel rotates, each segment driver engages the yoke plate and moves the yoke plate relative to the segment wheel. As the yoke plate is moved radially outwardly and inwardly, it swings arms pivoted to the main plate, moving pins on the arms into and out of engagement with the sides of a pair of adjacent spaced slots on the segment wheel to unlock and lock the work plate in position. Movement of the yoke plate also functions to operate oil pistons that supply lubrication to the index table.

5 Claims, 8 Drawing Figures

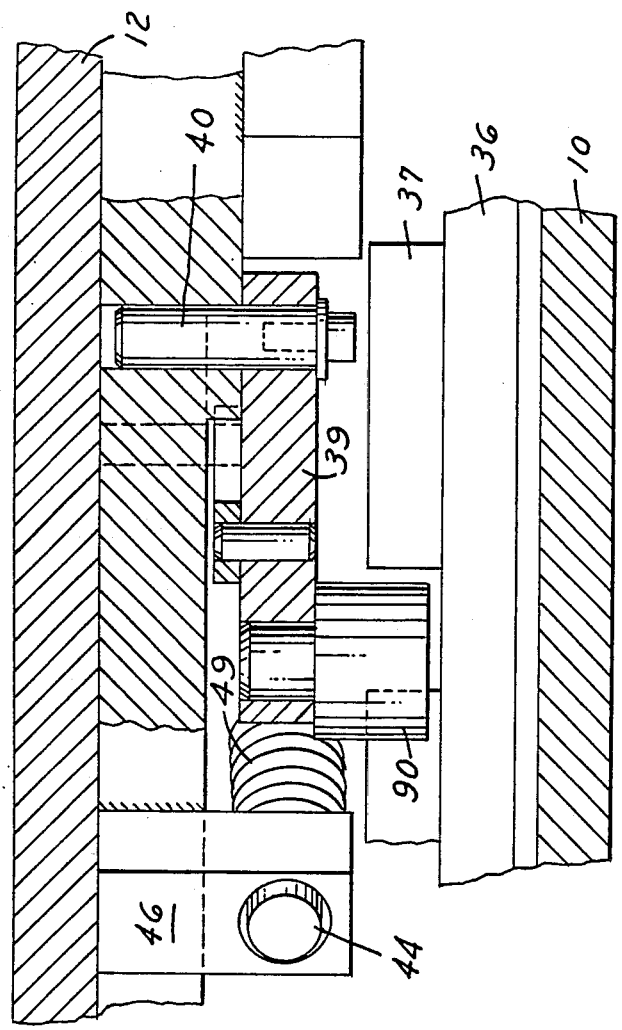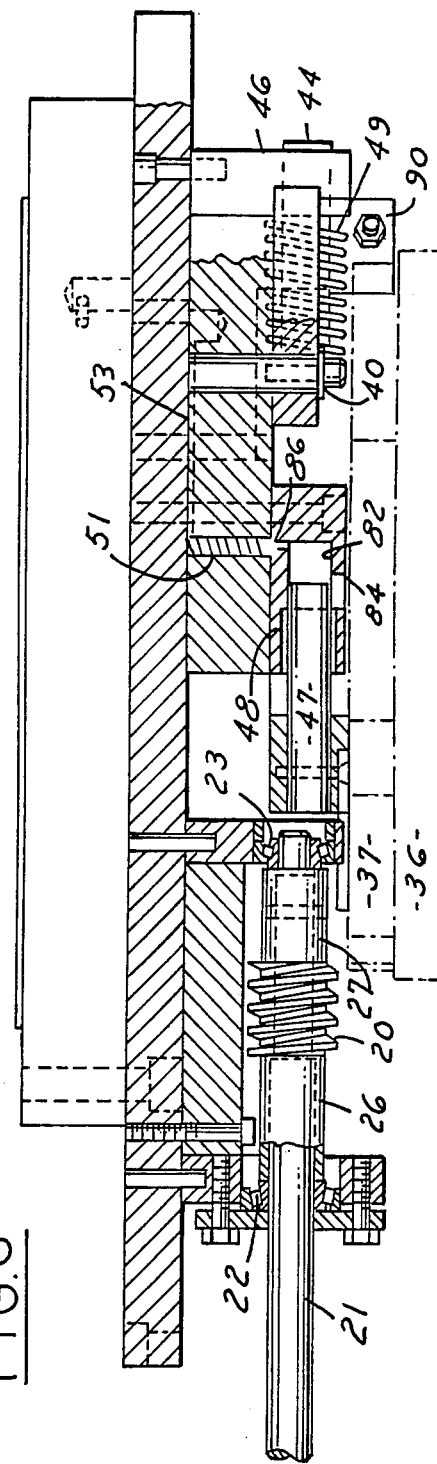

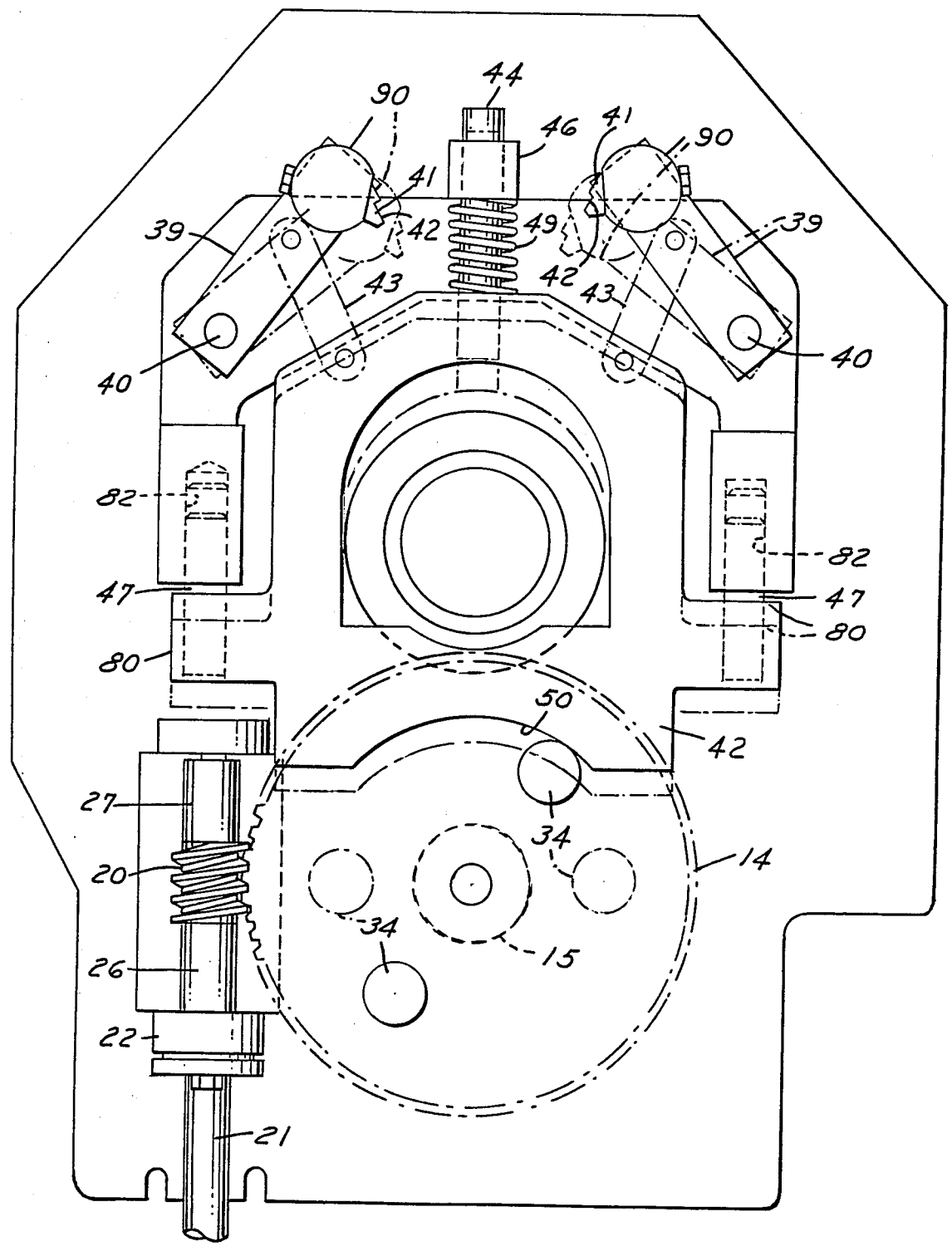

# 4,684,114

INDEX TABLES

BACKGROUND AND SUMMARY OF THE INVENTION

In the production of various articles by machining methods, it is common to mount the part on an index table which moves the part through various successive stations at which various operations are performed. It is desirable that the positioning at each station be accurate in order that the parts are accurately formed and maintain dimensional tolerances.

In U.S. Pat. No. 4,049,252 issued Sept. 20, 1977, there is disclosed an index table which comprises a base, a table mounted about an axis for rotation of the base and means for indexing said table to bring successive stations of the table into predetermined positions. Spaced locating plates are fixed on said table at circumferentially spaced points, and radially movable locking pins are provided on the base and are movable by a cam radially inwardly to engage the locating plates and lock the table relative to said base, and are movable radially outwardly to disengage the table from the base. Upon rotation of the table to move the radial locking pins radially outwardly, a pump is operated to pump oil to various portions of the table.

Among the objectives of the present invention are to provided an improved index table wherein the table is locked accurately independently of any external radial pressure, wherein the index table can carry large loads having a high inertia factor, wherein the design can be readily adapted to different numbers of stations, wherein the index table includes an improved lubrication system, wherein the index table includes visual means for verifying that the table is properly locked in position, and wherein the table is provided with sensing means for producing an electrical signal which can be connected to electronics associated with the operation of the index table and the functions that are being performed.

In accordance with the invention, the index table comprises a base, a main plate mounted on the base, a drive wheel mounted for rotation on one side of the main plate about a first axis transverse to the main plate, a work plate on the other side of the main plate rotatably mounted about a second transverse axis spaced from the first transverse axis, and a segment wheel mounted on the one side of said main plate and fixed with relation to the work plate. Circumferentially spaced segment drivers are mounted on the drive wheel and are adapted to engage circumferentially spaced slots on the segment wheel to intermittently drive the segment wheel and in turn the work plate. A yoke plate is mounted on the one side of the main plate for movement radially with respect to the drive wheel and the segment wheel. As the drive wheel rotates, each segment driver engages the yoke plate and moves the yoke plate relative to the segment wheel. As the yoke plate is moved radially outwardly and inwardly, it swings arms pivoted to the main plate, moving pins on the arms into and out of engagement with the sides of a pair of adjacent spaced slots on the segment wheel to unlock and lock the work plate in position. Movement of the yoke plate also functions to operate oil pistons that supply lubrication to the index table.

DESCRIPTION OF THE DRAWINGS

FIG. 5 is a fragmentary sectional view on an enlarged scale taken along the line 5—5 in FIG. 1.

FIG. 6 is a sectional view taken along the line 6—6 in FIG. 2.

FIG. 8 is a partly diagrammatic view similar to FIG. 2 showing the parts in various relative positions during operation.

DESCRIPTION

Figure 1:
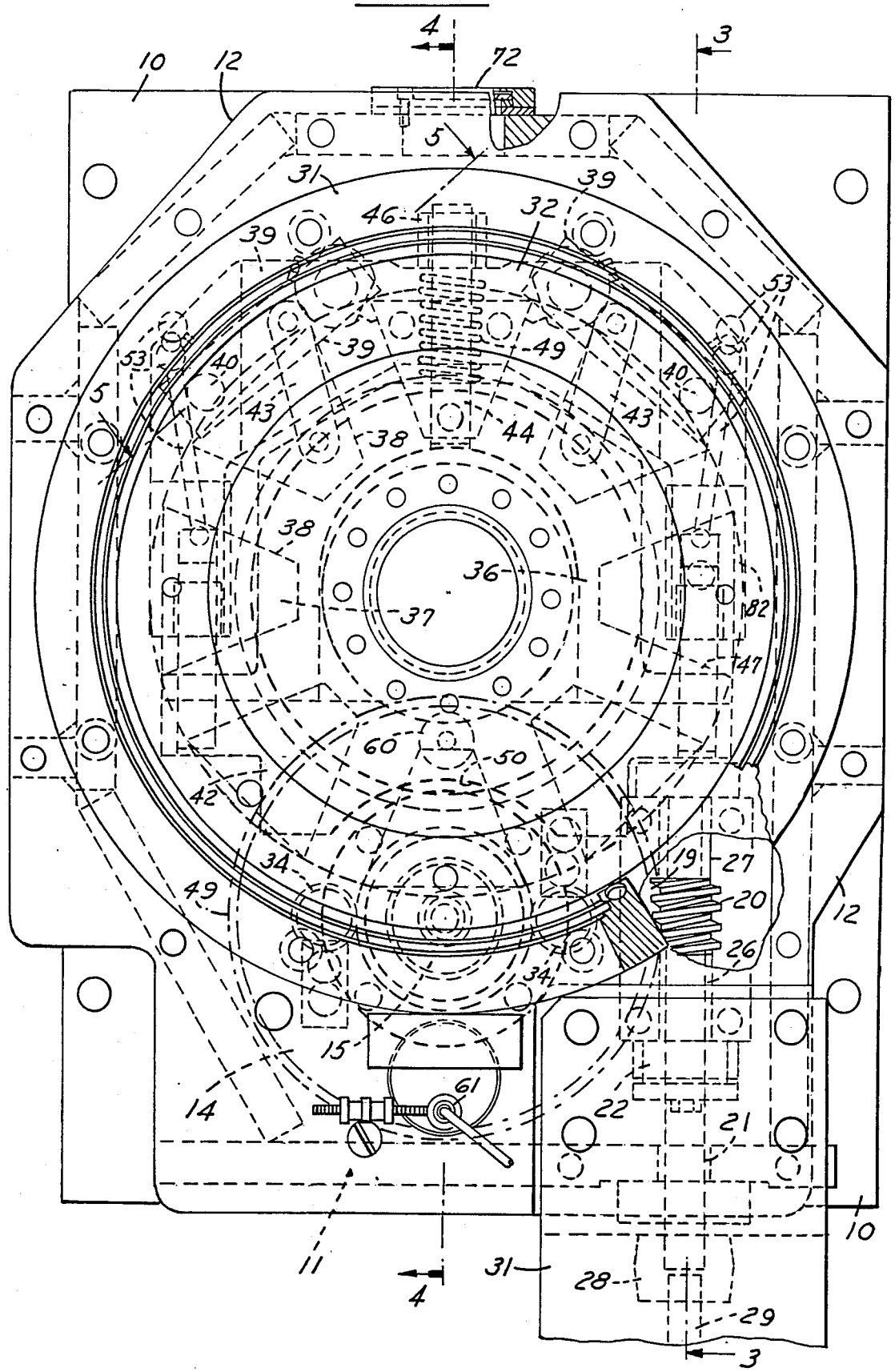
FIG. 1 is a part sectional plan view of an index table embodying the invention.
Figure 2:
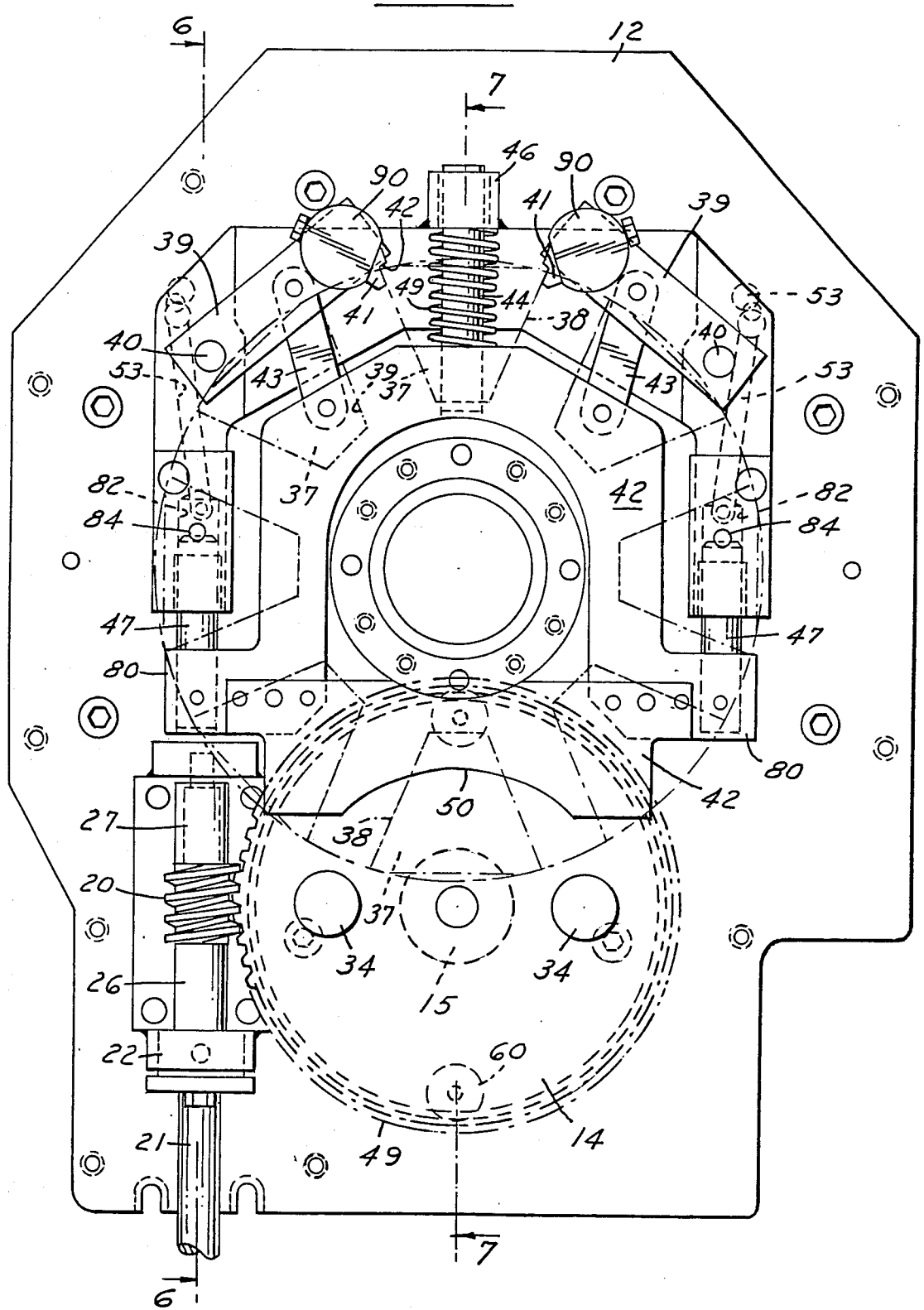
FIG. 2 is a bottom plan view with the base removed (and with parts 36 and 37 in phantom).
Figure 3:
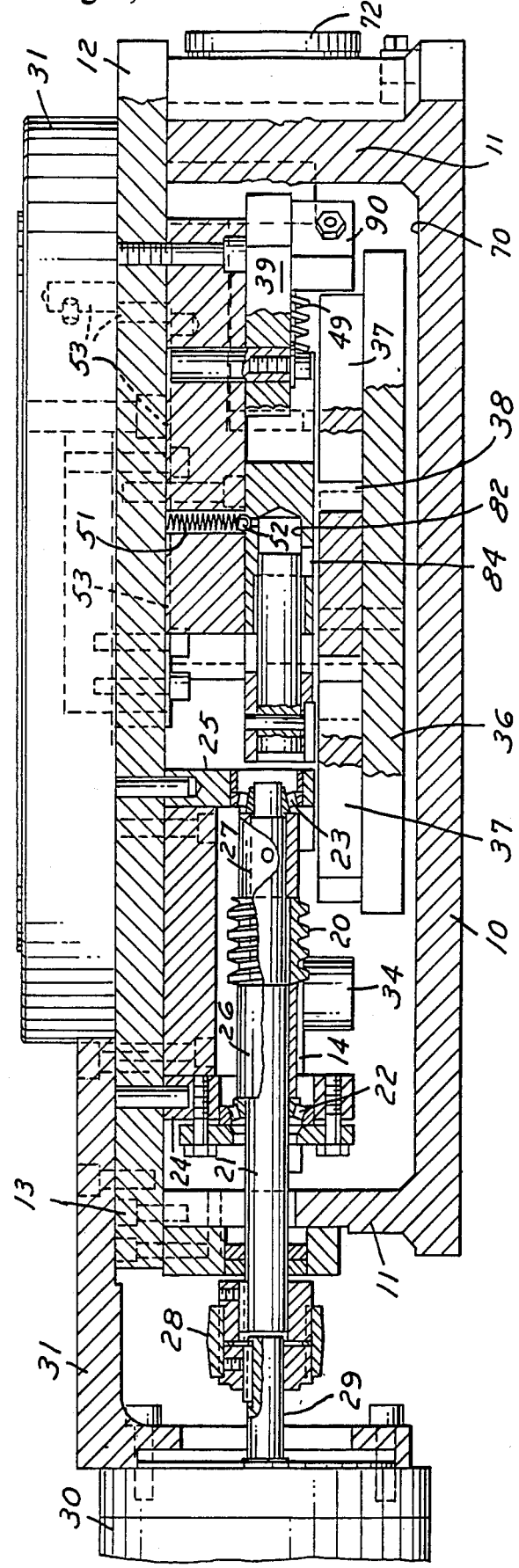
FIG. 3 is a sectional view taken along the line 3—3 in FIG. 1.
Figure 4:
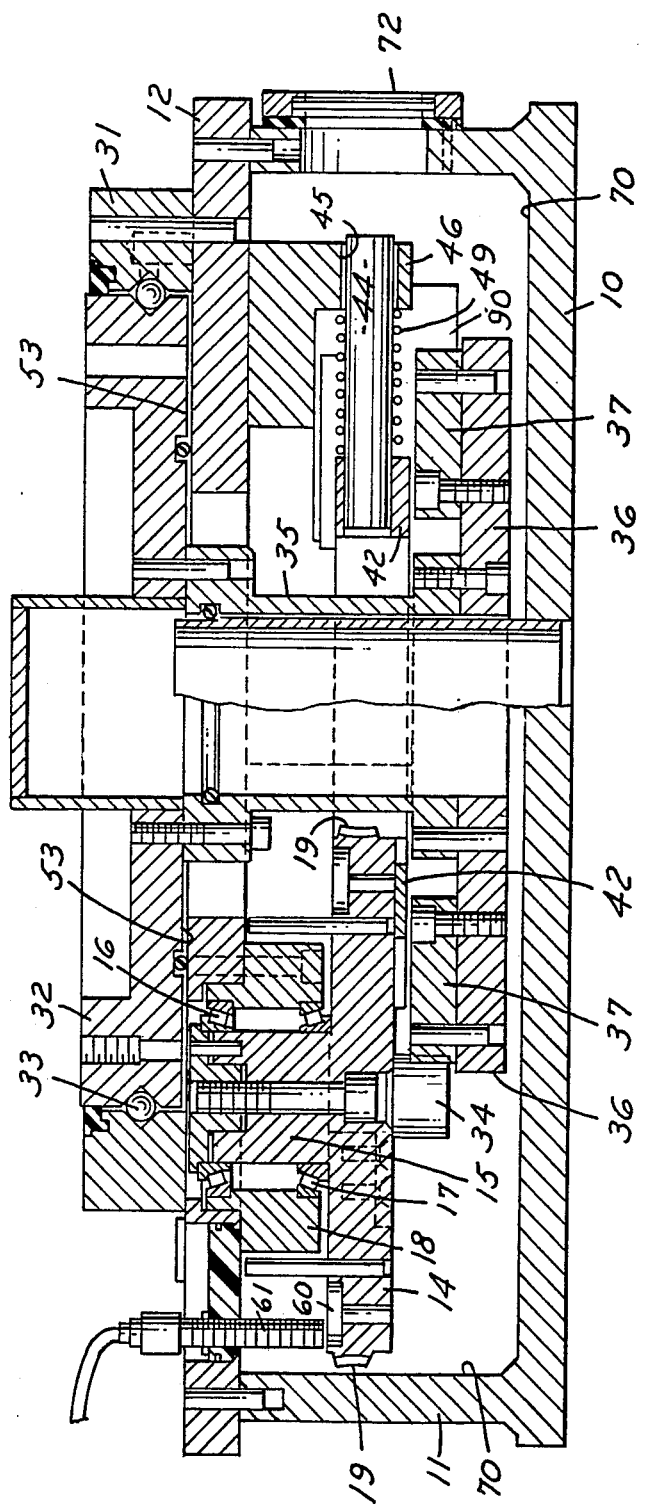
FIG. 4 is a sectional view taken along the line 4—4 in FIG. 1.
Figure 7:
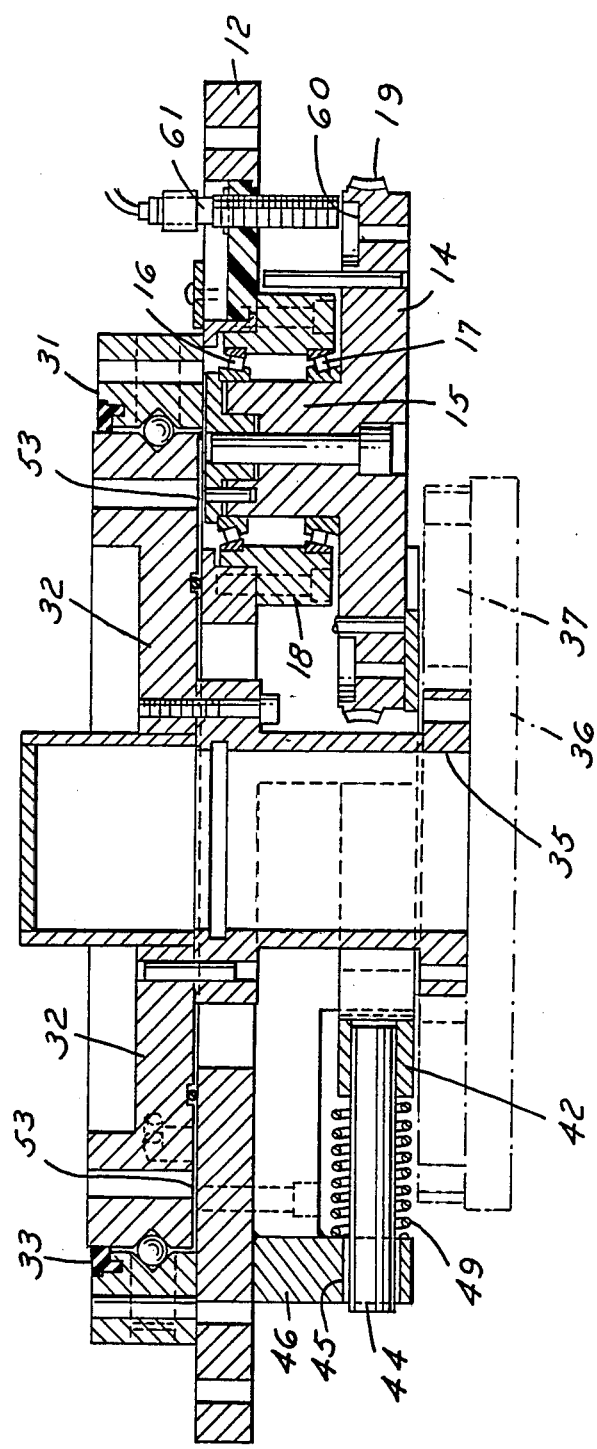
FIG. 7 is a sectional view taken along the line 7—7 in FIG. 2.

The drawings illustrate an index table in accordance with a presently preferred embodiment of the invention as comprising a base 10 having upstanding peripheral walls 11 extending around the periphery thereof. A main support plate 12 is fastened to walls 11 by the bolts 13 to form a hollow internal chamber 70 which encloses the index table operating mechanism. Chamber 70 is normally filled with lubricant, and a translucent window 72 (FIGS. 1, 3 and 4) extends through one portion of wall 11 for viewing of lubricant level, and also for viewing of the operating mechanism. A drive wheel 14 (FIGS. 1, 2, 4 and 7) has a hub 15 rotatably mounted beneath plate 12 within chamber 70 by the bearings 16, 17 positioned between hub 15 and a bearing ring 18 suspended beneath plate 12. A circumferential array of gear teeth 19 are formed in the periphery of drive wheel 14 and are engaged by a worm gear 20 on a shaft 21. Shaft 21 is rotatably mounted by bearings 22, 23 on bearing supports 24, 25 beneath plate 12 (FIG. 3). Spacer sleeves 26, 27 extend between bearings 22, 23 and gear 20. Shaft 21 is connected by a coupling 28 (FIGS. 1 and 2) to the output shaft 29 of a drive motor 30 mounted on a bracket 31. Bracket 31 is affixed to main plate 12. Thus, drive wheel 14 is continuously rotated about its vertical axis transverse to plate 12 by gear 20, shaft 21 and motor 30.

A main bearing 31 (FIGS. 1, 4 and 7) is mounted to plate 12 externally of chamber 70 in fixed position relative thereto. Ball rollers 33 rotatably support a work table 32 for rotation within main bearing 31 about a second axis spaced from and parallel to the axis of drive wheel 14, and thus transverse to the planes of rotation of drive wheel 14 and work table 32. A riser or sleeve 35 is affixed to work table 32 (see FIG. 4) and depends therefrom into chamber 70 to support a segment wheel 36. A plurality of circumferentially spaced wedge-shaped segments 37 are affixed to wheel 36 in a uniformly spaced array on the upper surface thereof facing in the direction of main plate 12. As best seen in FIG. 2, wedge-shaped segments 37 are circumferentially spaced from each other so as to form a corresponding circumferential array of intervening radially extending slots 38. The number of slots 38, and hence the number of segments 37, corresponds to the number of index positions through which index work table 32 is to be rotated.

A pair of drive pins 34 (FIGS. 2-4) are affixed to and depend from drive wheel 14 at positions diametrically opposite each other with respect to the axis of rotation of wheel 14. Drive pins 34 are so positioned on wheel 14 that, as wheel 14 is continuously rotated, drive pins 34 are sequentially brought into and out of engagement with successive slots 38 so as to incrementally rotate wheel 36 and thereby index work table 32 through each station in turn. In the embodiment of the invention illustrated in the drawings, wheel 36 associated with work table 32 includes eight slots 38. If the number of work stations, and hence the number of slots 38, varies, pins 34 are moved radially inwardly or outwardly on wheel 14 to accommodate the number of slots. Specifically, drive pins 34 would be positioned radially inwardly from the positions shown in the drawings toward the center of wheel 14 as the number of stations is reduced, and would be positioned radially outwardly relative to the center of wheel 14 as the number of slots and work stations is increased.

In order to lock work table 32 in position at each incremental station position, a locking mechanism is provided. This locking mechanism includes a pair of opposed arms 39 (FIGS. 2 and 8) that are mounted to plate 12 by pivot pins 40, one arm 39 being pivoted on each side of a plane that includes the axes of rotation of drive wheel 14 and work table 32. Arms 39 carry shells 90 which have adjustably positioned radially inwardly projecting fingers 41. Fingers 41 have opposed notches 42 that engage opposite side edges of the wedge-shaped segment 37 positioned therebetween. Thus, as viewed in FIG. 2, the projection 41 on one arm 39 is positioned within one opening or slot 38, while the projection 41 on the other arm 39 engages the same segment 37 from the opposite circumferential direction in the next-adjacent slot 38. Thus, with arms 39 in the positions shown in FIG. 2, the wedge-shaped segment 37 captured therebetween effectively locks plate 36 and therefore work table 32, against rotation about their common axis.

A yoke plate 42 (FIGS. 2-4 and 8) is positioned within chamber 70 between plate 36 and segments 37 carried thereby, and main support plate 12. Between drive wheel 14 and segments plate 36, yoke plate 42 terminates in an arcuate cam surface 50 opposed to the axis of rotation of drive wheel 14. A pin 44 projects outwardly from yoke plate 42 at a position diametrically opposite to cam surface 50. Pin 44 is slidably received within a passage 45 in a bracket 46 which depends from plate 12, and thus slidably supports yoke 42 for motion transversely of the axis of rotation of work table 32 and plate 36. A coil spring 49 encircles pin 44 and is captured in compression between yoke plate 42 and bracket 46 so as to resiliently urge yoke plate 42 in the direction of the axis of drive wheel 14—i.e. downwardly in FIGS. 2 and 8, and to the left in FIGS. 3 and 4.

As best seen in FIGS. 2 and 6 yoke plate 42 has a pair of wings 80 which project laterally oppositely of the direction of yoke plate motion. A pair of guide pins 47 are respectively affixed to yoke plate wings 80 and project therefrom in a direction parallel to pin 44, and hence parallel to the direction of sliding motion of the yoke plate. Pins 47 are slidably received within cylindrical bores 82 in brackets 48 which depend from plate 12. Pins 47 thus cooperate with brackets 48 for guiding opposite lateral sides of yoke plate 42. An inlet opening 84 is formed in each bracket 48 so as to communicate with bore 82 at a position axially of bore 82 so that pins 47 sweep opening 84 during motion of yoke 42. Pin 47 and bracket 48 thus additionally functions as the piston and cylinder of a lubricant pump which feeds lubricant through a check valve formed by a ball 52 and a coil spring 51 within bracket 48. Lubricant is thus fed under pressure through communicating passages 53 in the several drawing figures to the various moving parts.

A pair of links 43 (FIGS. 1, 2 and 8) are pivotally coupled at one end to yoke plate 42 on laterally opposite sides of guide pin 44, and are pivotally coupled at the other ends to arms 39 between corresponding pivots 40 and fingers 41. Cam surface 50 is positioned so as to be engaged by drive pins 34 in turn as drive wheel 14 is rotated so as to reciprocate yoke plate 42 in the direction of pin 44 and thereby move arms 39 out of locking engagement with the wedge-shaped segment 37 positioned therebetween. More specifically, as wheel 14 rotates, a drive pin 34 first enters a slot 38 (FIG. 8) and abuts yoke plate 42 at a corner of cam surface 50. Continued rotation of drive wheel 14 causes drive pin 34 to traverse cam surface 50, urging yoke plate 42 against spring 49 and moving arms 39 out of locking position. Thus drive pins 34 are able to rotate plate 36 through engagement with a segment 37 to the next index position of table 32. Continued rotation of drive wheel 14 brings the guide pin 34 out of driving engagement with surface 50, whereby spring 49 returns yoke plate 42 to the original position at which arms 39 lock the index table in its new position. The same motion of yoke plate 42 pumps lubricant oil to the various portions of the table as previously described.

A probe 61 (FIGS. 1, 4 and 7) is affixed to support plate 12 above drive wheel 14. Probe 61 cooperates with recesses 60 diametrically positioned on the upper surface of drive wheel 14 orthogonally of drive pins 34 for indicating to external electronics (not shown) that drive wheel 14 has rotated through one-half turn and thus has indexed table 32 to a new index position.

The invention claimed is:

1. An index table comprising
a base,
a main plate mounted on said base,
a drive wheel mounted for rotation on one side of said main plate about a first axis transverse to said main plate,
a workplate on the other side of said main plate rotatably mounted about a second transverse axis spaced from said first transverse axis,
a segment wheel mounted on said one side of said main plate and fixed with relation to the work plate,
said segment wheel having circumferentially spaced radially extending slots,
circumferentially spaced segments drivers mounted on said drive wheel and being adapted to successively engage said circumferentially spaced slots on said segment wheel to drive said segment wheel intermittently and in turn drive said work plate,
a yoke plate mounted on said one side of said main plate for movement radially with respect to said drive wheel and said segment wheel,
spaced arms pivoted to said main plate,
each said arm supporting a locking projection for movement into and out of engagement with a respective slot in said segment wheel, and means interconnecting said arms and said yoke plate such that as said wheel rotates, each segment driver successively engages the yoke plate and moves said yoke plate relative to said segment wheel and as the said yoke plate is moved radially outwardly and inwardly, it swings said arms moving the respective locking projections out of and into engagement with the sides of angularly spaced slots on said segment wheel to unlock and lock the work plate against rotation.

2. The index table set forth in claim 1 wherein said means interconnecting said arms and said yoke plate comprise a link individual to each said arm, one end of said link being pivoted to said yoke plate and the other end of said link being pivoted to its respective arm.

3. The index table set forth in claim 1 including means for mounting said yoke plate comprising a central radially extending opening on said main plate, said yoke plate having a projection extending through said opening, means for yieldingly urging said yoke plate toward said drive wheel, a pair of lubricant cylinders on said main plate, a pair of piston shafts on said yoke plate extending into said cylinders for guiding said yoke plate and controlling the lubrication.

4. The index table set forth in claim 3 wherein sensing means are provided between said main plate and said drive wheel for sensing the position of said drive wheel at any index position.

5. The index table set forth in claim 4 wherein said sensing means comprises a probe on said main plate and spaced pockets on said drive wheel adapted to be sensed by said probe.

* * * * *